Jan. 30, 1923.
W. F. MEADOWS.
ROBE FOR AUTOMOBILES.
FILED APR. 1, 1922.
1,443,631
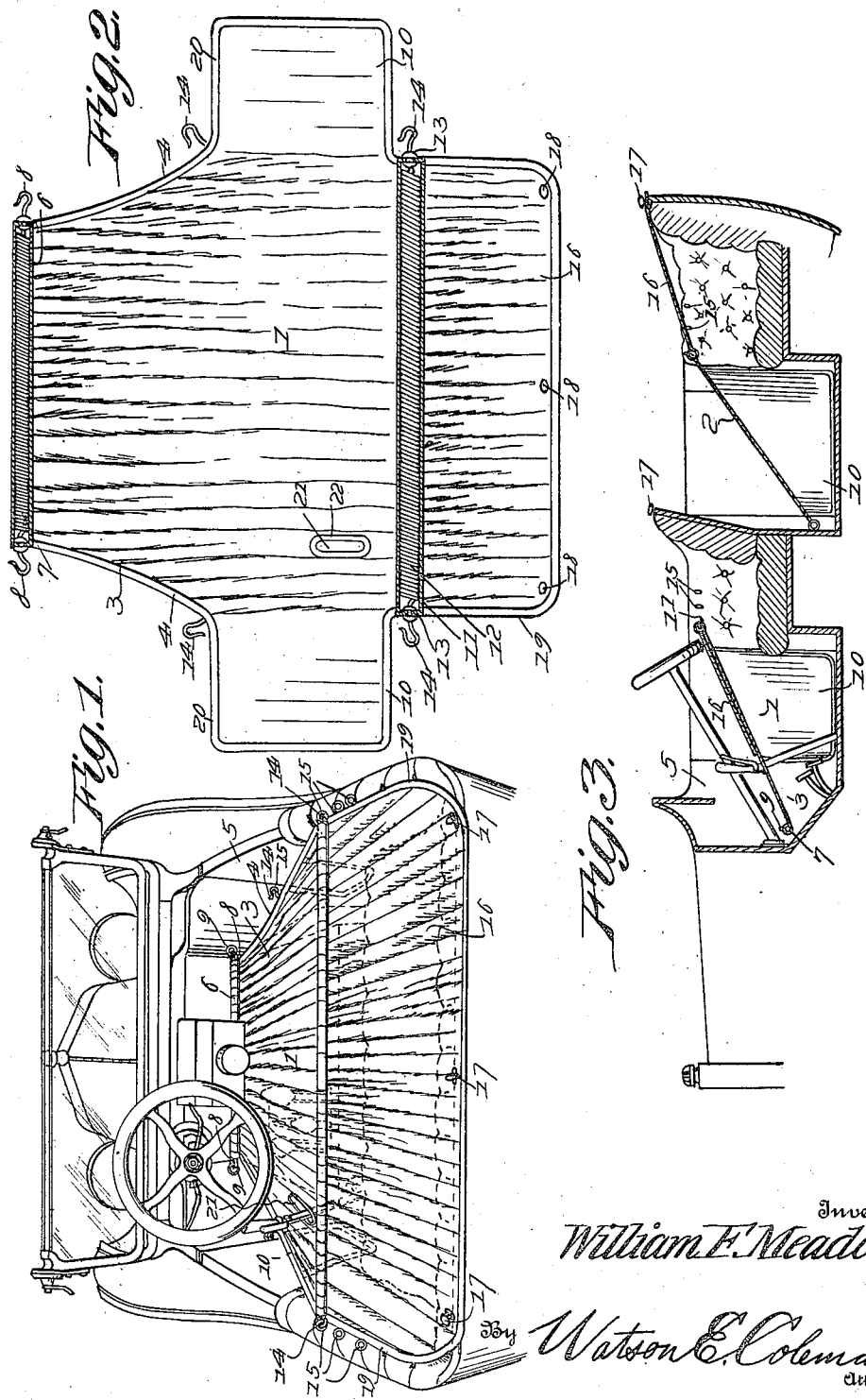
Inventor
William F. Meadows,
By Watson E. Coleman,
Attorney Patented Jan. 30, 1923.

1,443,631

UNITED STATES PATENT OFFICE.

WILLIAM F. MEADOWS, OF CHAPMAN, KANSAS.

ROBE FOR AUTOMOBILES.

Application filed April 1, 1922. Serial No. 548,813.

*To all whom it may concern:*

Be it known that I, WILLIAM F. MEADOWS, a citizen of the United States, residing at Chapman, in the county of Dickinson and State of Kansas, have invented certain new and useful Improvements in Robes for Automobiles, of which the following is a specification, reference being had to the accompanying drawings.

Robes of this character have heretofore been used, but the majority of them are impractical, due to the fact that they are fastened too high up, particularly adjacent the windshield at the forward part of the automobile, and are also fastened on the outside of the car, or hang over the outside. Others are not capable of fitting any size automobile, and those which are fastened too high upon the front of the car, say for instance to the instrument board, cover the various instruments, such as the speedometer, clock, oil gauge and ammeter. These robes prevent the chauffeur or operator from not only watching and operating the instruments on the instrument board, but also prevents accurate operation of the control levers, due to the fact that the operator is required to reach under such robes, to accomplish these purposes. The robes that fasten up and hang over the outside of the automobile, prevent the side doors from freely opening, when coming in and out of the automobile. The reason these various heretofore used robes do not fit different makes of cars, is due to the fact that they are not extensible or yieldable.

It is, therefore, the purpose of the present invention to avoid these disadvantages, and to provide a practical robe, which will permit of ready access to all the instruments on the instrument board, will enable the chauffeur or operator to easily observe the working of the speedometer, clock, oil gauge and ammeter.

Another purpose is to provide a robe, wherein the side portions hang adjacent the inside surface of the sides of the automobile, allowing the side doors to freely open without any interference from the robe, and when applied to an automobile which is equipped with the usual control levers, namely those for shifting the gears, starting and stopping the automobile, provision is made, whereby such lever or levers may protrude through the robe, allowing the operator or chauffeur to manipulate the levers from the exterior, instead of reaching under the robe, as in the former devices.

Still another purpose is the provision of a robe, which conforms to the shape of the automobile, at the place where it is fitted, and is fastened at the forward lower portion on the dash immediately above the inclined floor boards, in such a position that the robe passes over the various foot pedals a considerable distance, enabling the chauffeur or the operator to easily operate the foot pedals as may be required.

A further purpose is to provide a robe which is extensible or expansible, the same being full, in order to permit of such expansibility, so that the robe may fit any width of automobile. Furthermore due to its expansibility, the operator or chauffeur may readily enter and leave the automobile, without very materially disturbing the position of the robe. In fact the robe will stretch, and allow the chauffeur or operator to leave the automobile without undue interference.

Furthermore the robe may be easily and very quickly applied and removed, there being no cumbersome or unsightly attachments, to hold the robe in position, and furthermore the present form of robe is positioned so that it will fit across the occupant substantially adjacent the waist line, thereby fully covering the occupant, keeping out the rain, dust and the like.

A still further purpose is the provision of a robe having an extension flap, which may fold over upon the exterior of the robe when the automobile is occupied, and when it is unoccupied the flap may be disposed in a position to be fastened to the back of the seat of the automobile, thereby keeping out the water.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in perspective of the front portion of an automobile showing the improved robe as applied;

Figure 2 is a plan view of the robe used in front, it being obvious that a robe may be used at the rear;

Figure 3 is a sectional view through a portion of an automobile body showing the two robes applied to the front and rear.

Referring to the drawings, 1 and 2 designate robes to be applied to the front and rear of an automobile, to cover the laps, feet and legs of the occupants up to a point substantially adjacent the waist line.

The robe 1 may be any suitable shape or size, and may be constructed of any suitable material, preferably such material as is used in making up blankets and the like. Preferably the robe is of a shape to fit the contour of the forward part of the automobile, though it may be otherwise shaped. The forward part 3 of the robe is restricted in order to fit between the opposite sides of the body adjacent the dash immediately above the floor boards, and the side edges 4 are curved, to conform to the curvature of the sides 5 of the body. The extreme forward portion of the robe is provided with a loop 6 extending across the edge for the reception of an expansible coil spring 7, the convolutions of which are very closely formed, in fact contact with each other, and when in such positions, the forward restricted part of the robe is of a width less than the width between the extreme forward portions of the sides of the body of the automobile. Obviously when the robe is applied in position, it is necessary to stretch the extreme forward portion of the robe, in order to cause it to fit between the sides. It is obvious that the robe may be stretched or expanded sufficiently to fit most any width between the forward portions of the sides of the body, especially of automobiles other than the Ford type. This coil spring is anchored at its ends in any suitable manner to the forward corners of the robe, and due to the robe being full, in fact having quite a number of folds, the robe may expand transversely, due to the stretching of the spring. The ends of the spring 7 terminate in hooks 8, which engage screw eyes 9, which are located adjacent the foot board.

The robe is provided with suitable side flaps 10, which extend downwardly adjacent the inner faces of the sides of the body, in order to permit the side doors of the body to easily open without interference from the robe.

The edge of the robe which extends across the lap of the occupant substantially adjacent the waist line thereof is provided with a loop or channel 11 for the reception of the coil spring 12, similar to the spring 7. This spring at its ends is anchored in any suitable manner as shown at 13 to the robe, so as to enable the spring to give when the robe is stretched. Obviously the robe at this point is of less width than the width of the body of the automobile, that is to say, the width adjacent where the robe extends over the lap of the occupant. Therefore, when the robe is applied the spring 12 is expanded or stretched, and in this case the body of the robe unfolds, hence when the robe is applied, it is held taut, and yet the occupant may have freedom of movement, due to the expansibility of the springs, and due to the extensibility of the folds or pleats in the robe.

The ends of the spring 12 terminate in suitable hooks 14, which engage screw eyes 15, which are carried by the opposite side of the body of the automobile, in fact carried by the opposite arm rests of the seat. There are several of these screw eyes 15, in order to provide for interengageability of the hooks therewith. Robes used in automobiles necessarily stretch, that is to say lengthwise, and by providing several screw eyes 15, a robe when stretched may be connected to the screw eyes in such a manner as to take up this increased length.

Where the loop or channel 11 is formed for the reception of the spring 12, an extension flap 16 is connected to the robe. This extension flap, when the automobile is occupied may be folded back upon the exterior surface of the robe, thereby making a double cover at this point, and permitting the chauffeur to operate the various instruments on the instrument board, as well as manipulating the steering wheel and the parts carried thereby. However when the automobile is unoccupied the flap 16 is unfolded, and since it is provided with a plurality of suitable slots or openings or the like 17, it may be connected to the back of the seat, by means of the buttons 18. If necessary snap fasteners, such as are used for gloves may be substituted for the buttons. The flap 16 is also full, or in folds, in order to permit the flap to expand or give, incident to the stretching of the coil spring 12.

The edges of the flap 16 and the edges of the body of the robe are bound by any suitable binding 19 and 20, preferably of leather or the like, though other material may be used.

The body of the robe is provided with a suitable slot 21, the margin or edge of which is provided with a suitable binding 22. This slot is provided for the purpose of permitting the usual control lever to project therethrough, so that it can be manipulated on the exterior of the robe, without reaching under the robe as is the case with the robes heretofore mentioned.

The robe 2 which is used in the rear portion of the automobile is substantially the same as the robe 1 which is used in the front part of the automobile body, with the exception that the rear robe is of a slightly different shape, in order to conform to the inner contour of the body of the automobile. Furthermore the robe 2 is not provided with a slot 21, for there is no control lever at the rear.

The invention having been set forth, what is claimed is:—

1. A robe for automobiles having a plurality of folds extending forwardly and downwardly and provided with expansible means at its forward and rear edges, whereby the robe is capable of expansion transversely, and means for attaching the forward and rear corners of the robe to the body of the automobile, the body of the robe having side extension flaps to lie against the inner face of the sides of the body of the automobile, thereby permitting the side doors to freely open, and an extension hinged flap connected to the rear edge of the robe, adapted to fold upon the exterior of the robe when the automobile is occupied, and when unoccupied to open and extend to the back of the seat, said flap having means to attach it to the back of the seat.

2. A robe for automobiles provided with a plurality of folds caused to be formed by shirring the robe transversely, so as to permit the robe to expand transversely, said robe comprising a main section to extend from the front portions of the arms of the seat to a position adjacent the front portion of the interior of the automobile close to the foot board, an additional robe section extending from the front portions of the arms of the front seat to the back of said seat, means for attaching the lower front of the robe to the automobile, means for attaching the rear edge of the rear section of the robe to the back of the seat, yieldable means arranged adjacent one of the edges of the main section of the robe, said yieldable means comprising a pocket, a coil spring in said pocket and having terminals engaging through the ends of the pocket and terminating in hooks, and means whereby said hooks may be adjustably connected with the side arms of the seat, thereby holding the robe in position, whereby it will not interfere with the occupant of the seat.

In testimony whereof I hereunto affix my signature.

WILLIAM F. MEADOWS.